J. C. MIRE.
ATTACHMENT FOR CULTIVATORS.
APPLICATION FILED JULY 19, 1916.

1,204,298.

Patented Nov. 7, 1916.

WITNESSES
John B. Schrott
W. E. Beck

INVENTOR
Joseph C. Mire

BY
Munn & Co.
ATTORNEYS

UNITED STATES PATENT OFFICE.

JOSEPH C. MIRE, OF DREYFUS, LOUISIANA.

ATTACHMENT FOR CULTIVATORS.

1,204,298.  Specification of Letters Patent.  Patented Nov. 7, 1916.

Application filed July 19, 1916.  Serial No. 110,123.

*To all whom it may concern:*

Be it known that I, JOSEPH C. MIRE, a citizen of the United States, and a resident of Dreyfus, in the parish of Iberville and State of Louisiana, have invented an Improvement in Attachments for Cultivators, of which the following is a specification.

My invention is an improvement in attachments for cultivators, and has for its object to provide an attachment of the character specified, especially adapted for walking cultivators, wherein means is provided for permitting the beams to be simultaneously lifted to free the plows from the ground, or to lower them into operative position, and wherein the height to which they are lifted may be varied, and wherein other mechanism is provided in connection with the said lifting mechanism for regulating the depth of the cut of the plows.

Figure 1:
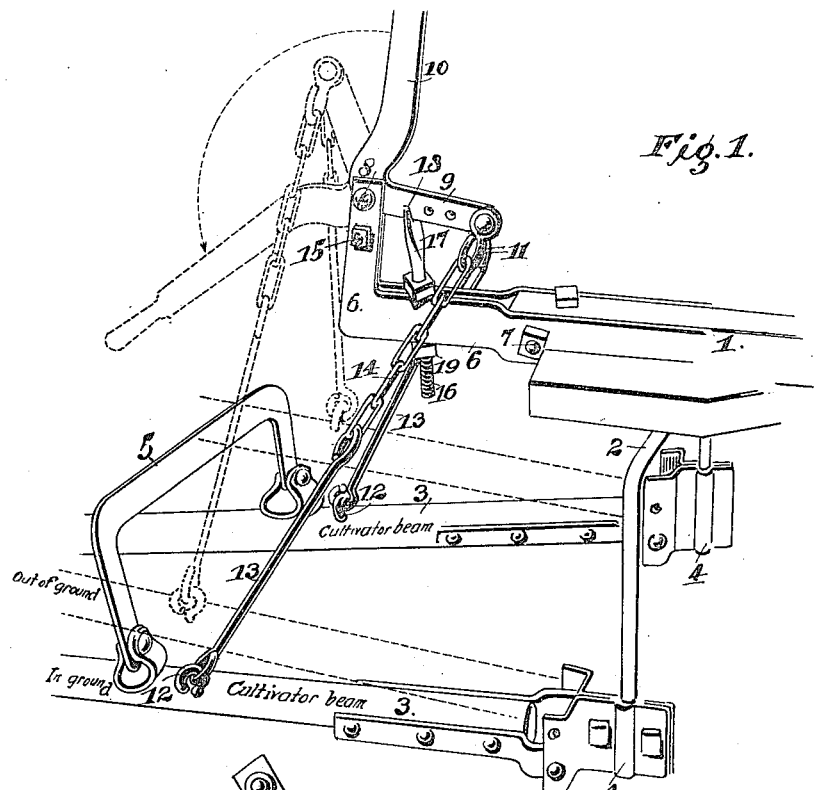
Figure 2:
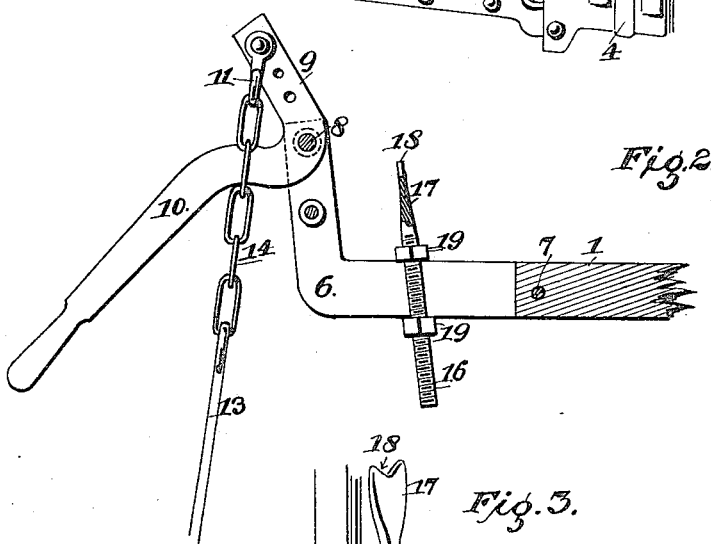
Figure 3:
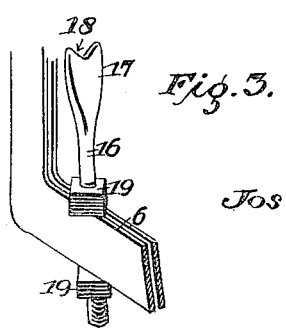

In the drawings: Figure 1 is a perspective view of a portion of a cultivator provided with the attachment, showing the plows in engagement with the ground. Fig. 2 is a side view with parts in section showing the plows elevated. Fig. 3 is a perspective view of the depth regulating device.

The present embodiment of the invention is shown in connection with a cultivator comprising a tongue 1, to which is connected the arch 2 of the axle, and the cultivator beams 3 are pivoted to the vertical portions of the arch as shown at 4 to swing in either direction. The beams carry the usual cultivating mechanism, and they are connected intermediate their ends by the arch 5.

Extending rearwardly from the tongue is a pair of angle bars 6, the said bars being secured at their front ends to the beam as indicated at 7, and the said bars are arranged parallel and in spaced relation, being spaced at their front ends by the beams. The vertical portions of the bars have alined openings, for receiving a bolt 8, and an elbow lever consisting of portions 9 and 10 is pivoted between the said vertical portions on the bolt 8.

As shown, the arm 10 of the elbow lever is offset toward the free end of the arm 9 from the connection, so that when the parts are in the position of Fig. 1, the arm 10 will stand slightly forward of the angular portions of the angle bars. The portion 10 of the lever is the handle, and the portion 9 is provided with a series of openings for receiving a bolt which connects a plurality of clevises 11 to the arm, and the said clevises may be connected in either opening.

Each cultivator 3 is provided with an eye 12 just in front of the arch 5, and each eye 12 is connected to the adjacent clevis 11, by means of a link 13 and a chain 14. The arrangement is such that when the lever is in the position of Fig. 1, the plows will be in the ground, while when the lever is in the position of Fig. 2 or in the dotted line position of Fig. 1, the plows will be out of the ground, and because of the manner of mounting the lever, in either position, the lever will be locked against accidental displacement.

A stop bolt 15 connects the vertical portions of the angle bars 6 below the bolt 8, in such position that when the lever is in the dotted line position of Fig. 1 it will engage the bolt to limit the further swinging of the lever.

Mechanism is also provided for regulating the depth of the plows in the ground, said device comprising a threaded rod 16, which is provided at its upper end with a head 17 having a notch 18 for engagement by the arm 9 of the elbow lever, to limit the downward swinging movement of the said arm under the weight of the plow beams. The rod 16 is passed between the horizontal portions of the angle bars, and the said rod is held in place between the bars by lock nuts 19 threaded onto the rod above and below the bars. It will be evident that by turning the said nuts in the proper direction the rod may be lifted or lowered.

When the parts are in the full line position of Fig. 1, the arm 9 of the lever rests in the notch 18 of the rod, thus limiting the downward movement of the plows, and retaining them at a certain predetermined depth, which may be varied by moving the rod upwardly or downwardly.

I claim:

An attachment for cultivators comprising in combination with the frame and the beams hinged thereto to swing on vertical axes and connected intermediate their ends to constrain them to swing together, of an angle frame connected to the frame of the cultivator between and above the beams and having one of its portions vertical, an elbow lever pivoted to the said vertical portion, a flexible connection between one arm of the elbow lever and each beam for raising and lowering the beams when the lever is swung, and means on the angle frame for engagement by the connected arm of the lever to limit the downward movement thereof and adjustable with respect to the angle frame for varying the position of the beams, said elbow lever being mounted to swing the free end of the connected arm to opposite sides of the vertical portion of the angle frame to cause the weight of the beams to hold the lever in either position.

JOSEPH C. MIRE.

Witnesses:
C. P. HELLVIN,
L. H. KERN.

Copies of this patent may be obtained for five cents each, by addressing the "Commissioner of Patents, Washington, D. C."